United States Patent
Schnell

(10) Patent No.: US 8,149,989 B2
(45) Date of Patent: Apr. 3, 2012

(54) DEVICE FOR DESTRUCTION-FREE INSPECTION OF A CONVEYOR BELT

(75) Inventor: Wolfgang Schnell, Hamburg (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 711 days.

(21) Appl. No.: 10/579,276

(22) PCT Filed: Apr. 21, 2005

(86) PCT No.: PCT/DE2005/000731
§ 371 (c)(1),
(2), (4) Date: May 12, 2006

(87) PCT Pub. No.: WO2006/066519
PCT Pub. Date: Jun. 29, 2006

(65) Prior Publication Data
US 2009/0147914 A1 Jun. 11, 2009

(30) Foreign Application Priority Data
Dec. 21, 2004 (DE) .......... 10 2004 061 367

(51) Int. Cl.
*G01N 23/02* (2006.01)
(52) U.S. Cl. ............................................ 378/58
(58) Field of Classification Search .......... 378/51, 378/54, 58; 250/548, 358.1, 359.1, 360.1; 356/237.2–237.5
See application file for complete search history.

(56) References Cited

U.S. PATENT DOCUMENTS

| | | | |
|---|---|---|---|
| 6,542,580 B1 * | 4/2003 | Carver et al. | 378/57 |
| 6,563,904 B2 * | 5/2003 | Wijts et al. | 378/58 |
| 7,065,175 B2 * | 6/2006 | Green | 378/57 |

FOREIGN PATENT DOCUMENTS

| | | |
|---|---|---|
| DE | 35 17 314 A1 | 1/1986 |
| DE | 83 37 970 U1 | 11/1987 |
| DE | 100 17 473 A1 | 11/2000 |
| DE | 101 40 920 A1 | 5/2002 |
| DE | 203 12 808 U1 | 5/2004 |
| DE | 203 808 U1 | 5/2004 |
| EP | 0 716 991 A | 6/1996 |
| JP | 04 158208 A | 6/1992 |
| JP | 2000 292371 A | 10/2000 |
| WO | WO 00/53517 A | 9/2000 |
| WO | WO 03/059789 | 7/2003 |

OTHER PUBLICATIONS

International Search Report (in German).

* cited by examiner

*Primary Examiner* — Jurie Yun
(74) *Attorney, Agent, or Firm* — Collard & Roe, P.C.

(57) ABSTRACT

A device for non-destructive inspection of a conveyor belt made from an elastomeric material has a carrying side for the goods to be conveyed, a running side, and an embedded strength support, whereby the conveyor belt is set in motion. A radiation source emits rays in the direction of the belt surface, which rays are so energy-rich that they pass through the conveyor belt, whereby a process computer evaluates the result of the irradiation test.

26 Claims, 1 Drawing Sheet

DEVICE FOR DESTRUCTION-FREE INSPECTION OF A CONVEYOR BELT

CROSS REFERENCE TO RELATED APPLICATIONS

Applicant claims priority under 35 U.S.C. §119 of German Application No. 10 2004 061 367.2 filed Dec. 21, 2004. Applicant also claims priority under 35 U.S.C. §365 of PCT/DE2005/000731 filed Apr. 21, 2005. The international application under PCT article 21(2) was not published in English.

The invention relates to a device for destruction-free inspection of a conveyor belt made of elastomer material, having a carrying side for the goods to be conveyed, and a running side, as well as having an embedded strength support, whereby the conveyor belt moves. With regard to the strength support, a differentiation is made between steel rope conveyor belts (St belts), textile conveyor belts (woven fabric belts), as well as aramide conveyor belts (D belts).

Nowadays, destruction-free inspection of conveyor belts usually takes place, in the case of steel rope belts, by means of magnet-inductive methods, in which measurement values are recorded as part of a pass-through method, which can provide indications for the presence of irregularities in the interior of the belt. Carrying out these studies and interpreting the test results cannot be done at the same time, and requires specially trained personnel. The test results must be supplemented with X-ray images of the suspected locations of the belt, for a more precise damage analysis. These tests are performed by special service companies who also own the testing devices. The entire procedure is very complicated, particularly since the belts have to be demagnetized again after the inspection.

There is no comparable method for textile belts or for aramide belts. Here, one must make do with an optical inspection of the surface, in which no information about the composition of the strength support is obtained, unless the damage is connected with a surface irregularity. The suggestion of monitoring the width of these belts by means of measurement technology (DE 101 40 920 A1) and of presuming that a weakening of the strength support has occurred if the belt width decreases, because the belt has lengthened at this location and thereby also reduced its width, has not yet been put into practice.

With regard to the state of the inspection technology for conveyor belts, reference is made, in particular, to the document WO 03/059789 A2.

With the background of the aforementioned problems, the task of the invention now consists in making available a device, within the framework of the pass-through method, which guarantees destruction-free inspection, independent of the type of strength support and the dimensions of the conveyor belt, which inspection makes any additional testing superfluous, while reducing the inspection time.

This task is accomplished, in accordance with the invention, in that a radiation source emits rays in the direction of the belt surface, which rays are so energy-rich that they pass through the conveyor belt, whereby a process computer evaluates the result of the irradiation test.

Practical embodiments of the device are also according to the invention.

The invention will now be explained using a particularly advantageous exemplary embodiment, making reference to a schematic drawing.

DETAILED DESCRIPTION OF PREFERRED EMBODIMENTS

Figure 1:
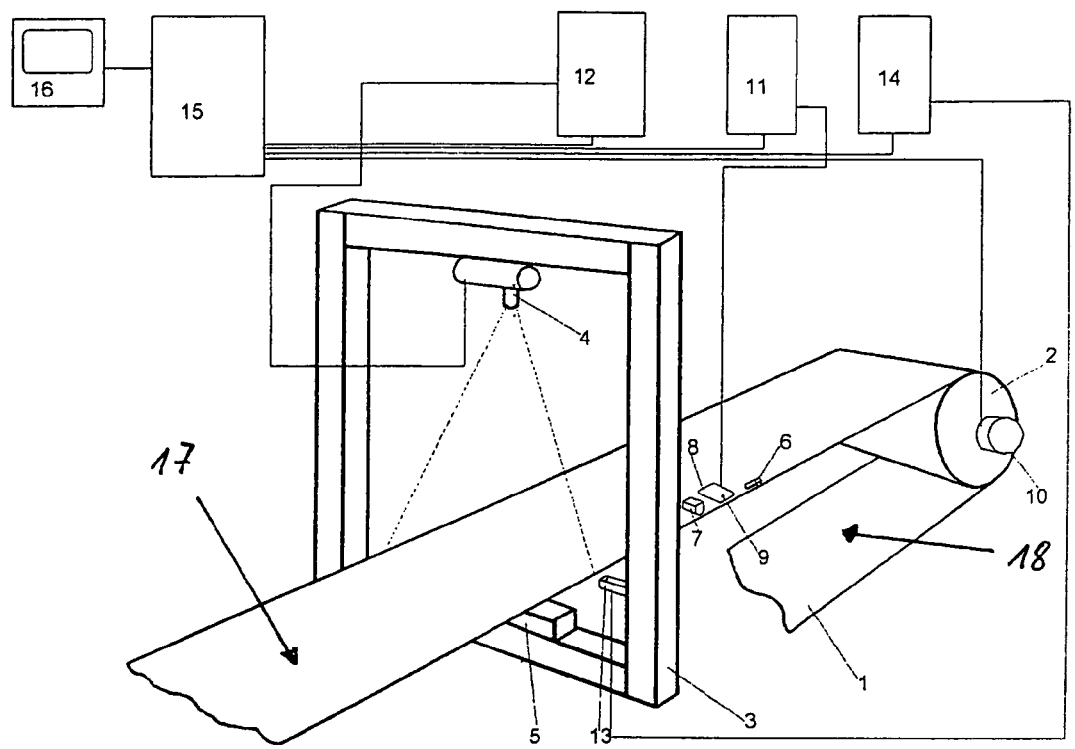
FIG. 1 shows an embodiment of the invention.

The device comprises a support stand, particularly a transportable support stand 3, which is a four-sided support frame, whereby the conveyor belt 1 (e.g. St belt) runs moving within the support frame, with reference to the upper belt part, particularly within its lower region. The radiation source 4, which is connected with a control device 12, is disposed on the upper part of the support frame, in this connection, and, in this connection, detects the entire width of the carrying side of the conveyor belt in the material-free state. In this connection, the radiation source emits high-energy rays, particularly in the form of X-rays or gamma rays. The gamma ray source is more cost-effective, in this connection, and can also be more easily adapted to the explosion protection regulations (ATEX guideline) required in anthracite coal mining. It is particularly suitable for the inspection of St belts. The use of an X-ray source, in turn, has the advantage that the energy of the rays being used can be adapted as needed, and therefore is able to also inspect textile belts, in particular. The support stand 3 or its direct vicinity is provided with a radiation protection device.

A line sensor 5 with image processor is disposed on the support frame 3, below the running side of the conveyor belt 1, which sensor corresponds with the radiation source 4 that lies opposite. In this manner, the rays can be bundled, in optimal manner, in terms of lines.

On one of the two side parts of the support frame 3, a defect marking system 13 is furthermore disposed, specifically in the region between the carrying side 17 and the running side 18 of the conveyor belt 1 as shown in FIG. 1. Furthermore, the defect marking system is coupled with a control device 14. The defect marking system can place a marking (e.g. a paint spot) on the belt if an irregularity or serious damage is detected, making it possible to find the location on the belt again, quickly and easily. In addition, the radiation source 4 corresponds with the defect marking system 13.

In connection with the radiation source 4, the line sensor 5 with image processor, and the defect marking system 13, the following additional measures can advantageously be used.

Figure 2:
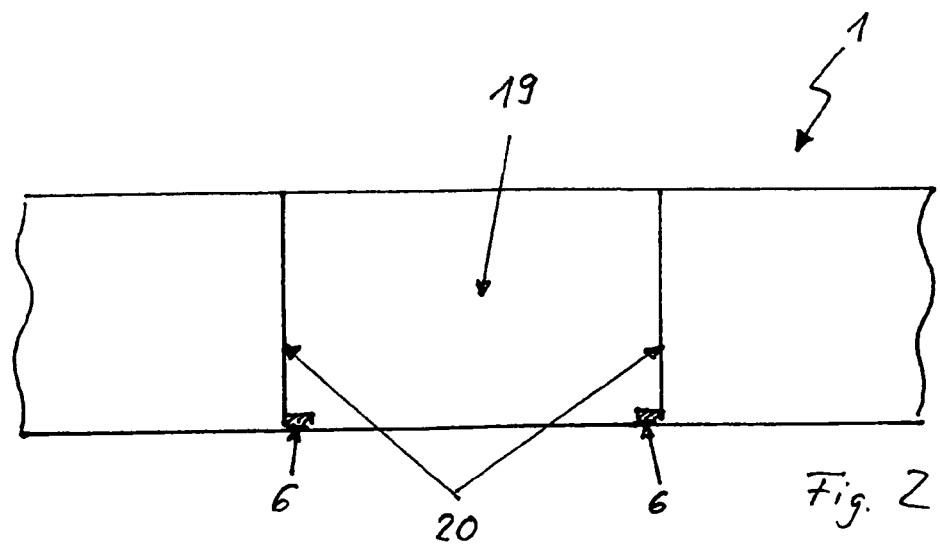
FIG. 2 shows an enlarged portion of the conveyor belt.

Two start markings 6 comprise, i.e. delimit a finite segment 19 of the conveyor belt 1. The length of each segment is 10 m to 500 m, particularly under the aspect of equal lengths, in each instance. Start mark 6 is situated at the two delimitations 20 as shown in FIG. 2.

With regard to the start marking 6, the following variants are used:

The start marking is formed by at least one notch, color strip, reflection zone, metal particle, or permanent magnet.

The start marking is a code, particularly under the aspect of mechanical, optical, magnetic, electrically conductive, or radioactive detection. The code, in turn, is a bar code or is structured similar to a bar code. Also, the code can consist of small permanent magnets, particularly in the form of a serial arrangement.

Detection of the start marking 6, in each instance, takes place by means of a scanning unit, particularly in the form of a reader head 7, without contact. In this connection, it is sufficient if a single scanning unit detects all of the start markings.

Every finite segment is provided with a distinct address, so that segment marking is formed. The distinctness is produced by means of segment numbering (e.g. 1, 2, 3, etc.).

Here, the address of the segment marking is a transponder 8. The scanning unit, which also performs the detection without contact, comprises an antenna 9 and a transponder reader 11. For the remainder, reference is made here to the general state of transponder technology.

The address of the segment marking can also detect those variants that were already mentioned in connection with the start marking 6, whereby then the scanning unit is also a read head 7, preferably within the framework of a common detection system of start marking and segment marking.

The address of the segment marking as well as the start marking are located within the carrying side of the conveyor belt 1, in its edge region. In this connection, it is advantageous if the transponder, in particular, is completely embedded in elastomer material. This also holds true when using a code, specifically in the form of a coded matrix (DE 100 17 473 A1).

The address of the segment marking and the start marking 6 are separate marking systems here, whereby it is advantageous if the address of the segment marking is situated in the vicinity of the start marking. In this connection, it is unimportant whether the address is disposed in front of or behind the start marking, with reference to the running direction of the conveyor belt.

According to one variant (not shown here), the address of the segment marking and the start marking 6 form a uniform marking system, for example in the form of a code in stripe form. The common scanning unit is then a read head.

The precise location determination takes place using an encoder that is driven by the conveyor belt 1 itself, for example by means of friction wheel coupling. Within the framework of the exemplary embodiment presented here, the encoder 10 is driven by way of the axle of a non-driven drum 2. The encoder produces a certain number of electrical pulses for a certain path distance. These pulses are acquired in the process computer 15 by means of a counter and, together with the segment marking and the address of the belt segment, yield precise location data for every point of the conveyor belt to be inspected. The precision of the location determination depends on the selection of the encoder and the precision of the determination of the segment marking, and can be very high. Precision values of a few tenths of a millimeter are possible.

The encoder can be, for example, a multi-pole encoder (DE 203 12 808 U1) or an optoelectronic encoder. In this regard, reference is made to the general state of encoder technology.

The process computer 15 is coupled with the following device parts, namely with:
the radiation source 4 including its control device 12;
the line sensor 5 with image processor;
the defect marking system 13 including its control device 14;
the first and second scanning unit, within the framework of a separate or common detection system, as well as the encoder 10.

The process computer 15 in turn is connected with a monitor 16, so that automated image evaluation is possible.

REFERENCE SYMBOL LIST 1 conveyor belt
2 non-driven drum (reversing or deflection drum)
3 support stand (support frame)
4 radiation source
5 line sensor with image processor
6 start marking (trigger marking)
7 read head
8 transponder
9 antenna for transponder
10 encoder
11 transponder reader
12 control device for radiation source
13 defect marking system
14 control device for defect marking system
15 process computer (controller)
16 monitor

The invention claimed is:

1. An assembly comprising:
   (a) a moving conveyor belt made of elastomeric material and having a belt surface, a carrying side for goods to be conveyed, a running side, and an embedded strength support;
   (b) a device for non-destructive inspection of the conveyor belt, said device comprising a radiation source and a process computer; and
   (c) a defect marking system corresponding with the radiation source;
   said radiation source emitting rays toward the belt surface to perform an irradiation test having a result, said rays being sufficiently energetic to pass through the conveyor belt; and
   the process computer evaluating the result of the irradiation test;
   wherein the process computer is coupled with the following device parts:
      the radiation source, by way of a radiation control device;
      a line sensor with image processor;
      the defect marking system, by way of a defect marking system control device;
      a first scanning unit and a second scanning unit, and an encoder;
   wherein
      the entire conveyor belt is divided into finite segments, whereby each segment is provided with a distinct address, so that segment marking occurs, whereby detection of the address of the segment marking, in each instance, takes place without contact, using the first scanning unit; and that
      the finite segments are delimited by a start marking, in each instance, whereby the detection of the start marking, in each instance, also takes place without contact, using the second scanning unit.

2. The assembly according to claim 1, wherein the radiation source emits X-rays or gamma rays.

3. The assembly according to claim 1, wherein the rays emitted by the radiation source strike an entire width of the conveyor belt.

4. The assembly according to claim 1, wherein the rays emitted by the radiation source strike the carrying side in a material-free state.

5. The assembly according to claim 1, wherein the radiation source is accommodated in an upper part of a transportable support stand.

6. The assembly according to claim 5, wherein the support stand is a four-sided support frame, whereby the conveyor belt runs within a lower region of the support frame.

7. The assembly according to claim 5, wherein the radiation source is coupled with the radiation control device.

8. The assembly according to claim 7, wherein the radiation source corresponds with the line sensor with image processor that lies opposite, which is disposed below the running side.

9. The assembly according to claim 8, wherein the line sensor with image processor is disposed on the support stand.

10. The assembly according to claim 1, wherein the defect marking system is disposed laterally with regard to the conveyor belt in the region between the carrying side and the running side.

11. The assembly according to claim 1, wherein the defect marking system is disposed on a support stand.

12. The assembly according to claim 1, wherein the finite segments are divided at a distance of 10 to 500 m in length.

13. The assembly according to claim 1, wherein the address of the segment marking as well as an address of the start marking are located within an edge region of the carrying side.

14. The assembly according to claim 1, wherein the address of the segment marking and an address of the start marking are a part of separate marking systems.

15. The assembly according to claim 14, wherein the address of the segment marking is in the vicinity of the start marking.

16. The assembly according to claim 1, wherein the address of the segment marking and an address of the start marking form part of a uniform marking system.

17. The assembly according to claim 1, wherein the address of the segment marking is a transponder, whereby the first scanning unit comprises an antenna and a transponder reader.

18. The assembly according to claim 1, wherein at least one of the address of the segment marking and an address of the start marking is formed by at least one notch, color strip, reflection zone, metal particle, or permanent magnet.

19. The assembly according to claim 18, wherein the first and second scanning unit are a common detection system.

20. The assembly according to claim 1, wherein at least one of the address of the segment marking and an address of start marking is a code.

21. The assembly according to claim 20, wherein the code is a bar code.

22. The assembly according to claim 20, wherein the code comprises a serial arrangement of small permanent magnets.

23. The assembly according to claim 1, wherein the encoder is driven by the conveyor belt itself.

24. The assembly according to claim 1, wherein the encoder is connected with a movable part of the conveyor belt.

25. The assembly according to claim 24, wherein the encoder is driven by way of an axle of a non-driven drum.

26. The assembly according to claim 1, wherein the process computer is coupled with a monitor.

* * * * *